United States Patent [19]

Erb

[11] Patent Number: 5,347,619
[45] Date of Patent: Sep. 13, 1994

[54] NONCONVEX POLYGON IDENTIFIER

[75] Inventor: David J. Erb, Austin, Tex.

[73] Assignee: International Business Machines Corporation, Armonk, N.Y.

[21] Appl. No.: 693,828

[22] Filed: Apr. 30, 1991

[51] Int. Cl.$^5$ ............................................. G06K 9/00
[52] U.S. Cl. .................... 395/126; 395/141
[58] Field of Search ............... 395/120, 121, 125, 126, 395/127, 129, 133, 118, 141

[56] References Cited

U.S. PATENT DOCUMENTS

| | | | |
|---|---|---|---|
| 3,889,107 | 6/1975 | Sutherland | 235/152 |
| 4,783,829 | 11/1988 | Miyakawa et al. | 382/22 |
| 4,791,582 | 2/1988 | Ueda et al. | 364/522 |
| 4,809,065 | 2/1989 | Harris et al. | 358/88 |
| 4,862,392 | 8/1989 | Steiner | 364/522 |
| 4,897,805 | 1/1990 | Wang | 395/129 |
| 4,930,091 | 5/1990 | Schroeder et al. | 364/522 |
| 4,933,865 | 6/1990 | Yamamoto et al. | 364/518 |
| 4,951,227 | 8/1990 | Todd | 364/518 |
| 4,962,468 | 10/1990 | Beauregard et al. | 364/521 |
| 5,129,051 | 7/1992 | Cain | 395/133 |

OTHER PUBLICATIONS

Triangulating Simple Polygons and Equivalent Problems. Fournier et al., ACM vol. 3, No. 2, Apr. 1984, pp. 153–174.

IBM TDB "Method to Determine the Convexity of Polygons", vol. 28, No. 5, Oct. 1985, pp. 2203–2208.

"Computer Graphics: Principles and Practice" J. Foley, A. Van Dam, S. Feiner, J. Hughes, Addison-Wesley, 1990, pp. 964–965.

*Primary Examiner*—Gary V. Harkcom
*Assistant Examiner*—Huynh Ba
*Attorney, Agent, or Firm*—Mark E. McBurney

[57] ABSTRACT

A method is provided for distinguishing nonconvex polygons from complex polygons. The present invention compares the edges of a polygon for self intersection points. Initially, "base" and "compare" edges are designated and bounding boxes for each of these edges are determined. The bounding boxes are then compared and if they intersect the edges may have points in common, whereas if no intersection occurs, then there are no common points and the edges are incremented and a comparison of other edges occurs. If it is determined that bounding boxes intersect, the intersection point for the edges under consideration is determined. If this intersection point lies within both bounding boxes, then the polygon is complex and the test ends. However, if the intersection point is outside either bounding box, then the edges are incremented and processing continues until all relevant edges have been considered.

18 Claims, 4 Drawing Sheets

NONCONVEX POLYGON IDENTIFIER

BACKGROUND OF THE INVENTION

1. Field of the Invention

The present invention relates generally to the processing and display of images on a display screen in a computer graphics system. More particularly, an improved method of rendering polygons is provided which identifies nonconvex polygons given only a list of vertices.

2. Description of Related Art

There are three classes of polygons which must be rendered and drawn to a display in a computer graphics system (see FIG. 3). Convex polygons make up the simplest class to draw, since the outer boundary never crosses itself and will always turn in the same direction. This type of configuration guarantees that there will be exactly one filled span in the "y" direction of a Cartesian coordinate system, and that for every "y" value contained within the polygon between the minimum and maximum (top and bottom) will have a filled span. A filled span refers to a scan line of picture elements (pixels), contained within the polygon, which are illuminated on the display in a computer graphics system.

Nonconvex polygons are more complicated than convex polygons, because even though the perimeter never crosses itself (nonconvex polygons have a definite inside and outside), internal angles are included which are greater than 180 degrees. Therefore, when a nonconvex polygon is drawn, there may be two separate spans for any given "y" value. That is, a nonconvex polygon may have a concave portion which will create spans to be scan converted in the "y" direction on either side of the concave area.

Complex polygons are the most complicated types of polygons and correspondingly the most difficult to scan-convert because there is no definite inside and outside. The perimeter of complex polygons can turn in any direction and cross itself. Therefore, in addition to the problems of having potential multiple "y" scan lines in the polygon and having no span lines for some "y" scan lines, complex polygons also have the problem of having two ways to fill the polygon. That is, since there is no definite inside or outside, it must be determined which area of the polygon to fill.

Conventional methods of filling complex polygons include the "odd-even" rule and the "winding" rule (Computer Graphics: Principles and Practice, J. Foley, A. van Dam, S. Feiner and J. Hughes, Addison-Wesley, 1990, page 965). Rendering complex polygons is an extremely computational intensive process and requires a great deal more time and resources than rendering nonconvex or convex polygons. Generally, rendering complex polygons requires 10 times as must time as rendering nonconvex polygons.

In conventional graphics systems, such as X Window System (X Window System is a trademark of the Massachusetts Institute of Technology) a client program sends a hint about the class of polygon to be rendered. This hint must be conservative, in that the least optimistic class must be used to render the polygon correctly. That is, a hint cannot indicate a less complicated class of polygon than the class the polygon to be drawn is actually in. For example, with convex polygons, the X-client can provide hints to convex, nonconvex or complex polygons and the convex polygon will be drawn correctly. However, for nonconvex polygons, hints directed to nonconvex or complex polygons are the only ones that will ensure proper rendering of the polygons. Finally, hints for complex polygons are the only ones that will properly draw a complex polygon. It can be seen that if a hint regarding a convex polygon is provided to the X-server and the polygon actually being drawn is complex, the results will be undefined, since methods for rendering convex polygons do not apply to complex polygons, and the polygon will be drawn incorrectly.

There exists conventional methods for identifying convex polygons, given a set of vertices, such that the corresponding hint can be provided. It can readily be seen that a method of distinguishing complex polygons from nonconvex polygons would be extremely advantageous, since knowing the class of polygon would allow the most efficient means of rendering the polygons to be utilized. Thus, the current necessity of using the most complicated procedures to scan convert polygons can be eliminated such that rendering of nonconvex polygons can occur up to 10 times faster.

SUMMARY OF THE INVENTION

In contrast to the prior art, the present invention provides a computationally inexpensive method for identifying a nonconvex polygon, given only the vertices, even though the polygon has been marked as complex. That is, when a "hint" noting the polygon as complex is provided, the present invention identifies the actual polygon to be drawn as nonconvex, or verifies that the polygon is really complex.

Broadly, the present invention is a comparison of the edges of a polygon for self intersection points. Initially, "base" and "compare" edges are designated and bounding boxes for each of these edges are determined. Bounding boxes are merely the rectangle encompassing the maximum and minimum (x,y) values for each edge. The bounding boxes are then compared and if they intersect the edges may have points in common, whereas if no intersection occurs, then there are no common points and the edges are incremented and a comparison of other edges occurs.

Once it is determined that bounding boxes intersect, the intersection point is calculated for the edges under consideration. If this intersection point lies within both bounding boxes, then the polygon is complex and the test ends. However, if the intersection point is outside either bounding box, then the edges are incremented and processing continues until all relevant edges have been considered.

In accordance with the previous summary, objects features and advantages of the present invention will become apparent to one skilled in the art from the subsequent description and the appended claims taken in conjunction with the accompanying drawings.

DETAILED DESCRIPTION OF THE PREFERRED EMBODIMENTS

Figure 1:
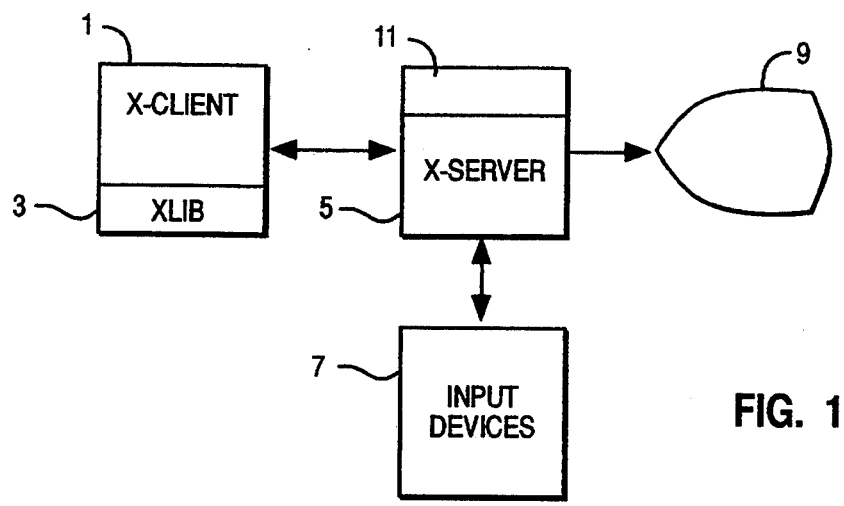
FIG. 1 is block diagram showing the type of hardware configuration on which the present invention may be implemented.

Referring to FIG. 1 a representative system on which the present invention may be implemented is shown. A block diagram of interconnected systems is shown in FIG. 1 wherein reference numeral 1 refers to a software application program called an X-Client that includes the X-Library (XLib) 3 resident thereon. X-Client 1 is in communication with X-Server 5 which is interconnected between a display 9 and input devices 7, such as a keyboard, mouse, or the like. It should be noted that the X-Client 1 and X-Server 5 are typically running on workstations capable of running the X-Windows system and may include the RISC System/6000, manufactured by IBM Corporation (RISC System/6000 and IBM are Trademarks of the IBM Corporation). The present invention as shown by reference numeral 11 resides in the X-Server such that as hints are provided by the X-Client to the X-Server, the present invention can perform the operation of determining whether a complex or nonconvex polygon needs to be drawn. For example, a user may desire to draw a specific polygon which is input to the X-Server via input devices 7 in conjunction with a program application (not shown). The X-Server then communicates with the X-Client which provides a hint as to how the polygon should be drawn. If the hint is "convex" then the present invention knows that the simplest polygon is to be drawn and proceeds. However, if the hint from X-Client 1 is "complex" the present invention is then invoked to determine whether the polygon to be drawn is in fact "complex" or really "nonconvex," since the X-Client is incapable of distinguishing between these two classes. Once this determination is made then the X-Server can draw the polygon to display 9 in the most efficient manner.

Figure 2A:
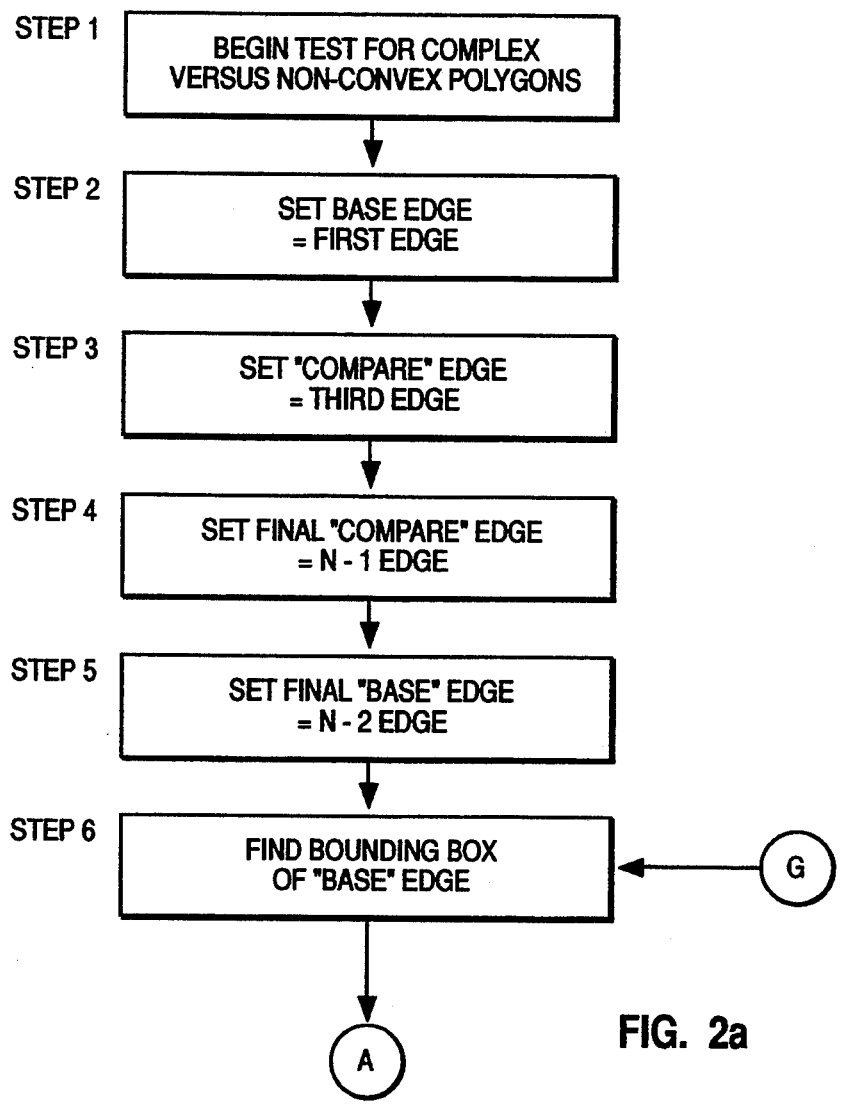
FIGS. 2a–2c are flowcharts illustrating the process utilized by the present invention to distinguish nonconvex polygons from complex polygons.
Figure 2B:
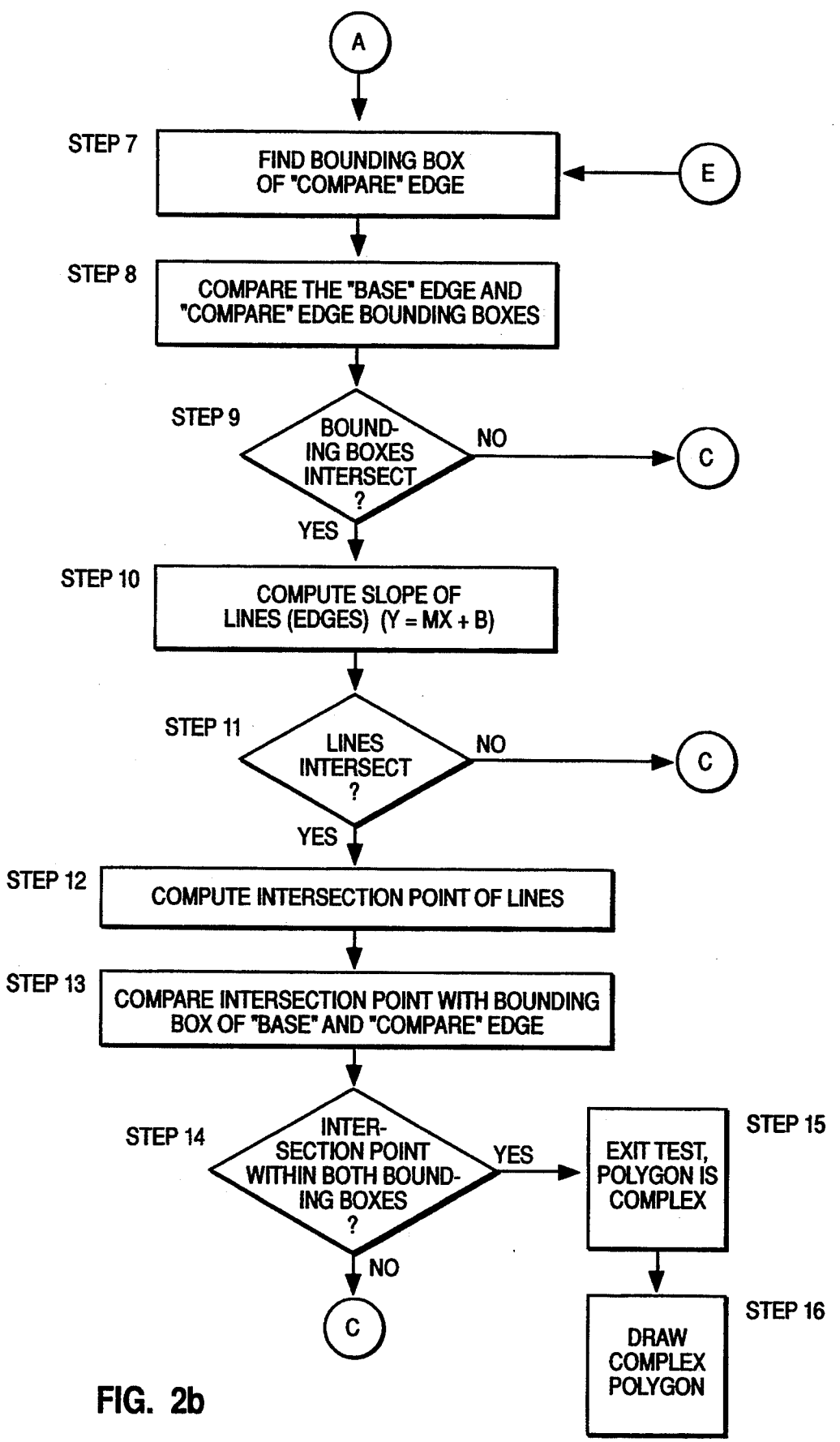
Figure 2C:
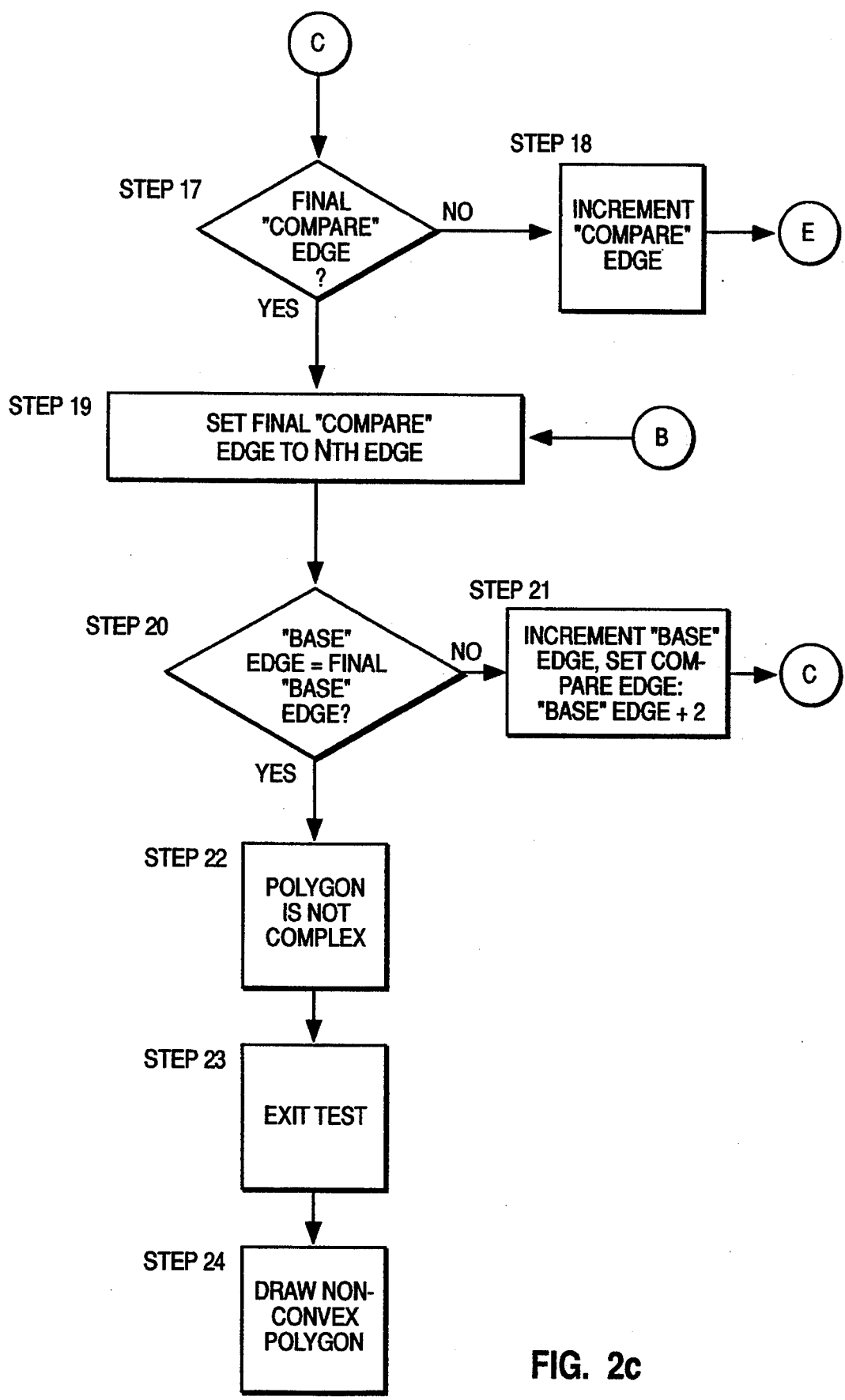

Referring now to FIGS. 2a–2c, flowcharts are shown which represent a method utilized by the present invention to identify nonconvex polygons. The process steps illustrated by flowcharts 2a–2c are implemented in software code which runs in conjunction with X-Server 5 and is resident thereon. This software code will then control workstation 5 such that physical display of nonconvex and complex polygons on monitor 9 will be implemented.

Figure 4A:
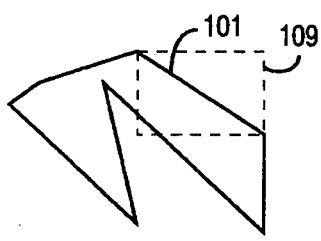
FIG. 4 shows examples of bounding boxes corresponding to two edges of a nonconvex polygon.
Figure 4B:
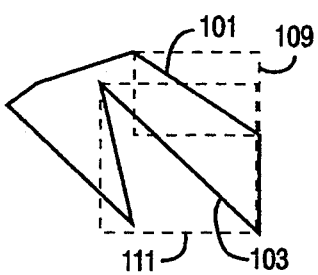
Figure 5:
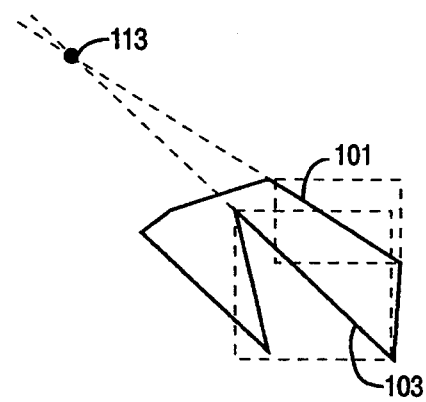
FIG. 5 illustrates the point of intersection of the edges bounded by the boxes of FIG. 4.

Referring to FIG. 2a, step 1 begins the test for complex versus nonconvex polygons. At this point a complex hint has been received by the X-Client and the present invention is now invoked to determine if in fact a complex polygon is to be drawn or merely a nonconvex polygon. At step 2, the base edge of a polygon is to be considered and is set equal to the first edge. For example, consider the nonconvex polygon illustrated in FIG. 3 wherein reference numeral 101 is used to indicate the base edge and as such this edge is considered to be the first edge. Designation of the base edge is arbitrary such that the present invention will function properly regardless of which edge of the polygon is considered as the base edge. Next, at step 3, the third edge of the nonconvex polygon of FIG. 3, proceeding clockwise therearound, is considered as the "compare" edge and noted by reference numeral 103. At step four the final compare edge is set to the N-1 edge which will be the edge adjacent to the base edge in the counter clockwise direction therefrom. Reference 105 notes the final compare edge of the nonconvex polygon of FIG. 3. At step 5 the final base edge is set to the N-2 edge which will be adjacent to the final compare edge and counter clockwise therein and is noted by reference numeral 107. At step 6, a bounding box is then determined for the base edge of the polygon being considered. Polygon A of FIG. 4 shows the nonconvex polygon of FIG. 3 having a bounding box 109 around the base edge 101. It can be seen that bounding box 109 is merely the rectangle formed from the maximum and minimum x,y values for edge 101. Subsequent to step 6, the bounding box for the compare edge is determined at step 7. Again referring to FIG. 4, bounding box 111 is shown encompassing the compare edge 103 of polygon B and superimposed over bounding box 109 which rectangularly encompasses the base edge 101. At step 8, of the flowchart of FIG. 2b, a comparison is made between the base edge bounding box 109 and the compare edge bounding box 111. Step 9 then determines if the bounding boxes intersect. If no intersection occurs, the method proceeds to step 17, as described in detail below. Assuming that the bounding boxes do in fact intersect, then the slope of edges 101 and 103 is computed at step 10 by using linear algebra, e.g. the Y-intercept equation ($y = mx + b$). Next, step 11 determines whether the lines of the edges (in this case edges 101 and 103) intersect. Referring to FIG. 5, it can be seen that edges 101 and 103 do in fact intersect at a point 113. If however the lines did not intersect (the edges are parallel) then the process once again continues to step 17. The coordinates for the intersection point 113 are computed at step 12, and step 13 compares intersection point 113 with the bounding boxes of 109, 111 of the base and compare edges, respectively. Step 14 then determines whether the intersection point 113 is within both of the bounding boxes for the compare and base edges. If so, then the present invention has determined that the polygon is complex. The test is then exited at step 15 and procedures are implemented to draw the complex polygon at step 16. However, for the initial comparison of the convex polygon of FIG. 3 with a base edge 101 as compared to edge 103, it can be seen from FIG. 5 that the intersection point 113 is not within the bounding boxes 109, 111. Therefore, the process continues to step 17 (FIG. 2c) where it is determined if the compare edge being considered is the "final" compare edge, i.e. the N-1 edge set at step 4. If the compare edge is not the final compare edge, as is the case in the initial consideration of the edges of a polygon, i.e. the first pass through the flowchart procedures, the compare edge is incremented at step 18 and the process is returned to step 7 where the bounding box of the newly incremented compare edge is found. This new bounding box is then compared with the base edge at step 8, as previously described. If at step 17, the final compare edge 105 (the N-1 edge) is encountered, then step 19 sets the final compare edge to the Nth edge, which is shown by reference numeral 106 in the nonconvex polygon of FIG. 3. It can be seen that until the final compare edge is encountered at step 17, the present invention performs as many iterations as there are "compare" edges which must be compared with the base edge 101. Subsequent to setting the final compare edge to the Nth edge at step 19, step 20 determines whether the base edge is in fact the final base edge (the N-2 edge of step 5). If the final base edge 107 (FIG. 3) has not been encountered at step 20, then the base edge is incremented at step 21 and the compare edge is set equal to the base edge plus two. It can be seen that the compare edge, when considered with respect to the base edge, can be incremented by 2 since a single incrementation would consider a compare edge that is adjacent to a base edge, and by definition adjacent edges cannot intersect one another. The process then returns to step 6 where the bounding box of the incremented base edge is determined and the process proceeds through the flowchart of FIGS. 2a, 2b and 2c as previously described. If it is determined at step 20 that the base edge is in fact equal to the final base edge then it can be seen that the polygon is not complex (step 22), since at no time during the consideration of the edges of the polygon was the intersection point of two edges contained within both bounding boxes for those edges. At step 23 the test is exited and step 24 invokes procedures for drawing a nonconvex polygon in the computer graphics system as shown in FIG. 1.

Figure 3A:
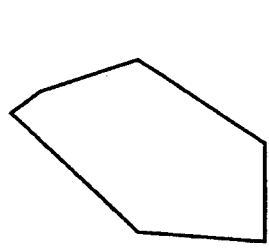
FIG. 3 shows examples of the three classes of polygons considered by the present invention.
Figure 3B:
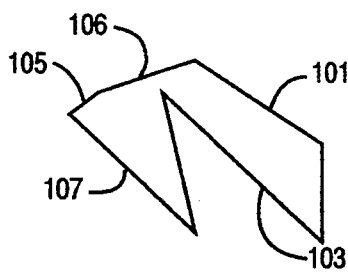
Figure 3C:
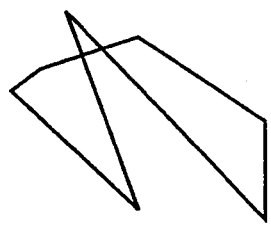
Figure 6A:
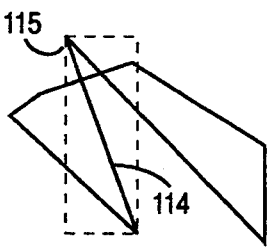
FIG. 6 shows examples of bounding boxes corresponding to two edges of a complex polygon.
Figure 6B:
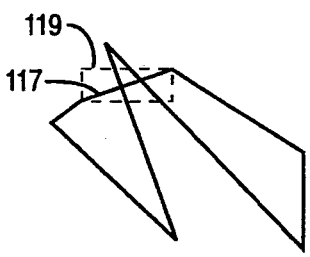
Figure 7:
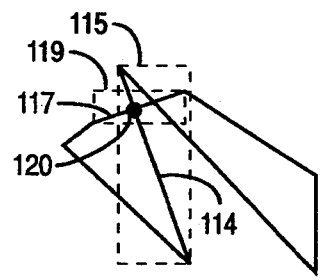
FIG. 7 illustrates the intersection point of the two edges considered in FIG. 6 and that this point of intersection is contained within both bounding boxes.

Referring to FIG. 6, the complex polygon of FIG. 3 is shown with a bounding box 115 surrounding a first edge 114 and bounding box 119 encompassing edge 117. FIG. 7 shows bounding boxes 115 and 119 superimposed on each other. Referring back to the process of the present invention wherein at step 9 it is determined whether the bounding boxes intersect. It can be seen that boxes 115 and 119 do in fact intersect, as shown in FIG. 7. Next, at step 10 the slope of edges 114 and 117 is computed and at step 11 it is determined whether the lines representing edges 114 and 117 intersect. It can be seen that edges 114 and 117 do intersect and the coordinates of the intersection point 120 are computed at step 120. The intersection point 120 is then compared with bounding boxes 115 and 119 and step 14 determines whether the intersection point 120 is within both bounding boxes 115 and 119. FIG. 7 illustrates that point 120 is within bounding box 115 and bounding box 119. Therefore, it can be seen that the polygon has edges which intersect each other and it can be classified as complex. The polygon is then drawn on the system of FIG. 1 by using procedures relating to complex polygons.

Thus, it can be seen that the present invention provides a means of determining whether a nonconvex or complex polygon is to be drawn. Thus, the proper drawing techniques for each polygon can be implemented, thereby increasing the speed at which the nonconvex polygon can be drawn by a factor of 10.

Although certain preferred embodiments have been shown and described it should be understood that many changes and modifications may be made therein without departing from the scope of the appended claims.

What is claimed is:

1. A computer implemented method of identifying a polygon to be displayed on a computer graphics system, said method comprising the steps of:
   determining a bounding box for each of at least two non-adjacent edges of said polygon, said bounding boxes having dimensions corresponding to x and y coordinates of said at least two edges;
   determining a point of intersection between lines representing said at least two non-adjacent edges;
   comparing said point of intersection with each of said bounding boxes; and
   utilizing the results of said comparison to determine whether said polygon is a complex polygon having self intersecting edges and multiple y scan lines for a single x value, said polygon to be scan converted by said computer graphics system.

2. A method according to claim 1 wherein said step of determining a bounding box comprises the steps of designating one of said at least two edges as a base edge and another of said edges as a compare edge.

3. A method according to claim 2 wherein said step of utilizing comprises the steps of:
   determining if said point of intersection is within each of said bounding boxes; and
   identifying said polygon as a complex polygon.

4. A method according to claim 3 wherein said step of identifying comprises the steps of:
   invoking procedures to display said complex polygon by filling said complex polygon with color; and
   displaying said complex polygon on said computer graphics system.

5. A method according to claim 2 wherein said step of utilizing comprises the steps of:
   determining if said bounding boxes intersect;
   determining if said point of intersection is outside at least one of said bounding boxes;
   identifying said polygon as a nonconvex polygon when all of said points of intersection between said base edge and said compare edge are not within associated ones of said bounding boxes, or none of said bounding boxes intersect.

6. A method, according to claim 5 wherein said step of identifying comprises the steps of:
   invoking procedures to display a nonconvex polygon by filling said nonconvex polygon with color; and
   displaying said nonconvex polygon on said computer graphics system, 7. A method according to claim 5 wherein said step of identifying comprises the steps of:
   incrementing said base edge and said compare edge;
   determining an incremented bounding box for said incremented base edge and said incremented compare edge;
   determining a point of intersection of said incremented based edge and said incremented compare edge; and
   determining if said incremented point of intersection lies outside either of said incremented bounding boxes.

8. A method according to claim 7 wherein said step of incrementing comprises the step of incrementing said base edge and said compare edge by a factor of two.

9. A method according to claim 8 wherein said step of determining a point of intersection comprises the steps of:
   computing the slope of said base and said compare edges; and
   computing the point of intersection between said base edge and said compare edge, based upon said computed slope.

10. A system for identifying a polygon to be displayed on a computer graphics system, comprising:
    means for inputting said polygon to said computer graphics system in order to display said polygon:
    means for determining a bounding box for each of at least two non-adjacent edges of said input polygon, said bounding boxes having dimensions corresponding to x and y coordinates of said at least two non-adjacent edges;

means for determining a point of intersection between lines representing said at least two non-adjacent edges;

processor means for comparing said point of intersection with each of said bounding boxes; and means for utilizing the results of said comparison to determine whether said input polygon is a complex polygon having self intersecting edges and multiple y scan lines for a single x value.

11. A system according to claim 10 wherein said means for determining a bounding box comprises means for designating one of said at least two edges as a base edge and another of said edges as a compare edge.

12. A system according to claim 11 wherein said means for utilizing comprises:

means for determining if said point of intersection is within each of said bounding boxes; and means for identifying said polygon as a complex polygon.

13. A system according to claim 12 wherein said means for identifying, comprises:

means for invoking procedures to display said complex polygon by filling said complex polygon with color; and means for displaying said complex polygon on said computer graphics system.

14. A system according to claim 11 wherein said means for utilizing comprises:

means for determining if said bounding boxes intersect;

means for determining if said point of intersection is outside at least one of said bounding boxes;

means for identifying said polygon as a nonconvex polygon when all of said points of intersection between said base edge and said compare edge are not within associated ones of said bounding boxes, or none of said bounding boxes intersect.

15. A system according to claim 14 wherein said means for identifying comprises:

means for invoking procedures to display a nonconvex polygon by filling said nonconvex polygon with color; and means for displaying said nonconvex polygon on said computer graphics system.

16. A system according to claim 14 wherein said means for identifying comprises:

means for incrementing said base edge and said compare edge;

means for determining an incremented bounding box for said incremented base edge and said incremented compare edge;

means for determining a point of intersection of said incremented base edge and said incremented compare edge; and means for determining if said incremented point of intersection lies outside either of said incremented bounding boxes.

17. A system according to claim 16 wherein said means for incrementing comprises means for incrementing said base edge and said compare edge by a factor of two.

18. A system according to claim 17 wherein said means for determining a point of intersection comprises:

means for computing the slope of said base and said compare edges; and means for computing the point of intersection between said base edge and said compare edge, based upon said computed slope.

* * * * *